United States Patent Office 2,785,206
Patented Mar. 12, 1957

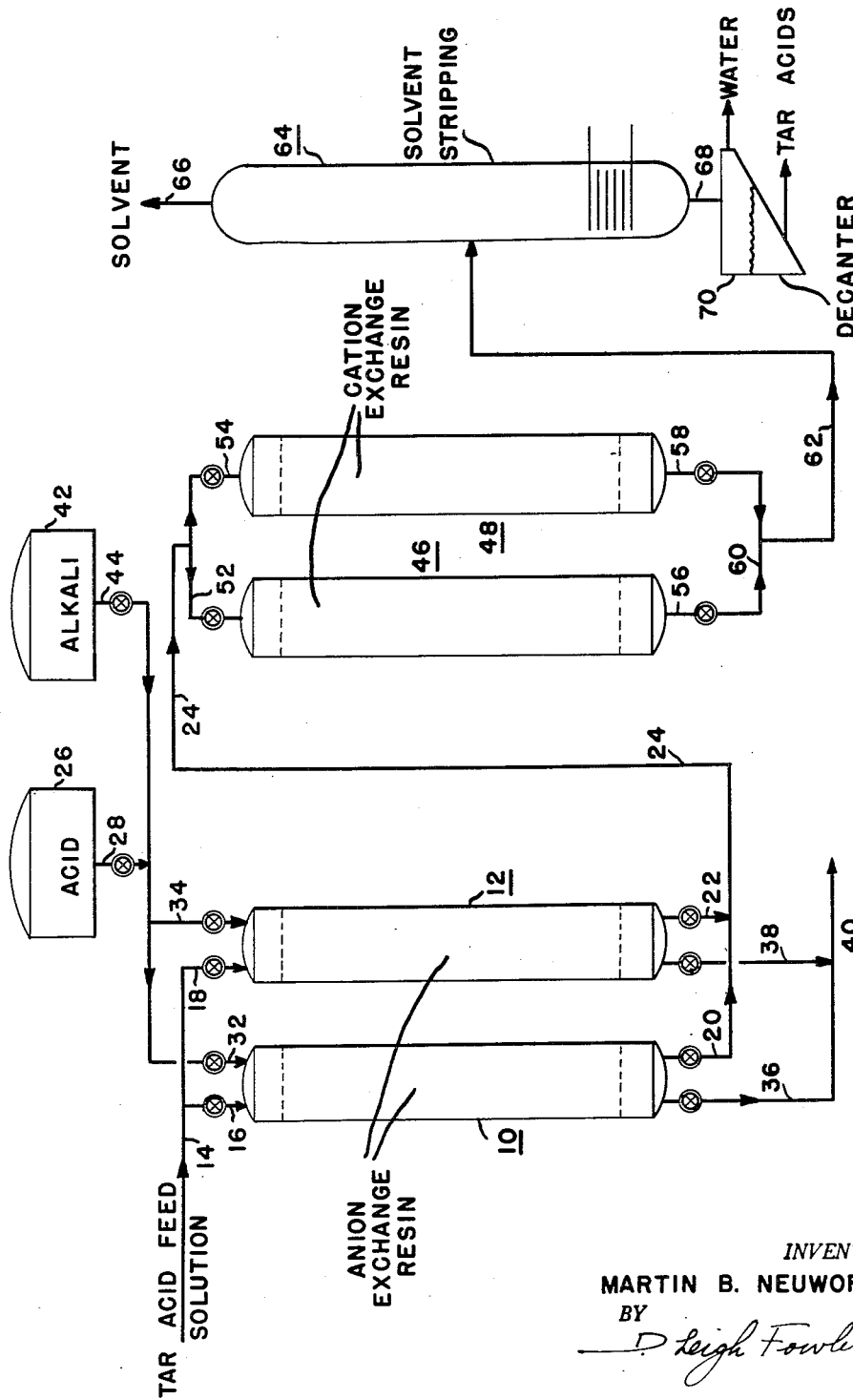

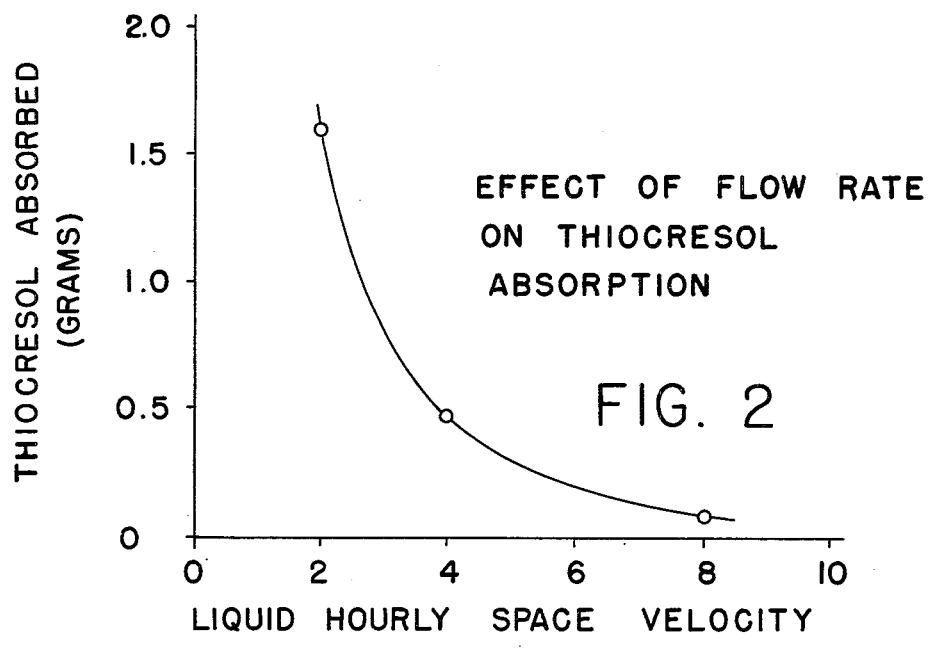
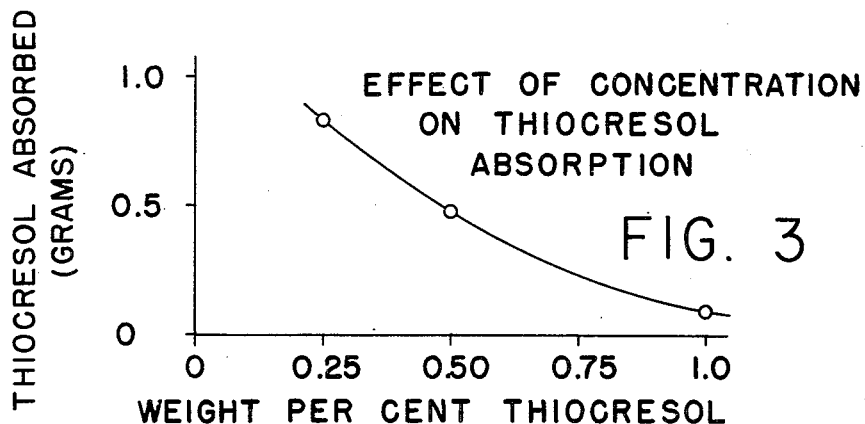

2,785,206

SEPARATION OF TAR ACIDS AND THIOPHENOLS

Martin B. Neuworth, Pittsburgh, Pa., assignor to Pittsburgh Consolidation Coal Company, Pittsburgh, Pa., a corporation of Pennsylvania Application October 23, 1953, Serial No. 387,973

3 Claims. (Cl. 260—627)

This invention relates to the purification of tar acids, and more particularly, to the separation of thiophenols from tar acids.

This application is a continuation-in-part of my application, S. N. 215,214, filed March 13, 1951, now abandoned, and of my copending application, S. N. 276,991, filed March 17, 1952, now U. S. Patent 2,734,925 issued February 14, 1956, all assigned to the same assignee.

The principal sources of tar acids are coke-oven tar and petroleum distillates produced by the cracking of oil. The conventional method of recovering tar acids from either source is extraction of the tar acids with aqueous caustic solution to produce water soluble tar acid salts. The latter are separated from the source material by decantation and reconverted to the acids by reaction with mineral acids.

The extraction of tar acids by means of aqueous caustic solution is accompanied by the extraction of any thiophenols that may be present, since the latter are even stronger acids than the phenols themselves. The amount of thiophenols present in the original source material varies widely, being sometimes as small as one-half percent by weight of the phenols and ranging as high as twenty-five percent and above. Their presence in the extracted tar acids is undesirable for many industrial applications.

Many processes have been proposed for the removal of thiophenols from the caustic extracted tar acids. Most of those that have had commercial success are based upon oxidation of the thiophenols in an aqueous medium to disulfides. The latter are relatively insoluble in the aqueous medium and may therefore be separated from the soluble tar acids. Nevertheless the thiophenol content is generally of the order of one percent which is still undesirably high for certain resin uses of the tar acids.

In accordance with my invention, a process is provided for separating thiophenols from tar acids. The separation effected is substantially complete. Tar acids having no detectable odor of thiophenols are obtained. Briefly the process comprises the following steps: (1) dissolving the mixture of tar acids and thiophenols in a suitable solvent (the process is ineffective unless a solvent is employed); (2) passing the resulting solution through a bed of granular, strongly basic anion exchange resin; (3) regulating the flow rate of the solution so that the liquid hourly space velocity (LHSV) is less than 3 reciprocal hours; (4) recovering the effluent solution from which substantially all the thiophenols have been removed by the resin; and (5) regenerating the resin, if the process is continuous, when it fails to absorb all the thiophenols. The tar acids, free of thiophenols, may be readily recovered from the effluent solution.

For a better understanding of my invention, its objects and advantages, reference should be had to the following description and to the accompanying drawings in which:

Figure 1 is a diagrammatic illustration of an apparatus for carrying out the preferred embodiment of my invention;

Figure 2 is a graph of the relationship between weight percent of thiophenols adsorbed on the resin and the liquid hourly space velocity of the feedstock over the resin; and Figure 3 is a graph of the relationship between weight percent of thiophenols adsorbed on the resin and the concentration of thiophenols in the feedstock.

Referring specifically to Figure 1 of the drawings, a system is shown therein for continuously removing thiophenols from tar acids. The feedstock consists of a tar acid solution containing tar acids in admixture with a minor proportion of thiophenols. It is generally obtained by caustic extraction of tar acid oil fractions, and is accordingly substantially free of neutral oil and tar bases. The feedstock may, however, be obtained in other ways. For example, it may be obtained by solvent extraction of tar acid oil as described in the copending application S. N. 184,474, filed September 12, 1950, by E. Gorin and the present applicant now Patent No. 2,666,796. Regardless of the source, the feedstock contains tar acids contaminated by thiophenols.

The tar acid feedstock is dissolved in a solvent, preferably an organic polar solvent, for example, methanol, ethanol, acetone, methyl ethyl ketone, etc. It is preferred that the solvent be aqueous to the extent that the solubility of the tar acids in the organic solvent is not affected. The precise amount of the water that may be thus tolerated varies with the composition and concentration of the tar acids, but may be readily and simply determined by solubility tests.

The feedstock solution is fed to one of the resin towers 10 and 12 through a main conduit 14 and one of the inlet conduits 16 and 18. The towers 10 and 12 consist of vertical vessels adapted to confine a bed of granular anion exchange resin which derives its exchange capacity essentially from strongly basic groups. A typical example of such a resin and one which I prefer to employ is a resin which derives its exchange capacity principally from organic quaternary ammonium groups. The feedstock solution is passed downwardly through the bed of resin and discharged at the bottom through one of the outlet conduits 20 and 22 into a conduit 24. Initially the anion exchange resin adsorbs tar acids as well as the thiophenols so that the liquid discharged at the bottom of the resin chamber is substantially pure solvent. However, the resin quickly reaches the point where it is saturated with the tar acids. Thereafter, the thiophenols in the feed solution displace the tar acids from the resin with the result that the discharged solution contains tar acids free of thiophenols. Depending upon the concentration of acids in the feed solution and the amount of granular resin in the treating towers, a period of time will elapse before the resin becomes saturated with the thiophenols to the point where the effluent contains thiophenols. Before this point is reached the feed solution is diverted from one of the towers 10 and 12 to the other to permit continuous resin treatment of the feedstock.

The effluent solution from the towers 10 and 12 may be sent directly to a solvent stripper for recovery of the low boiling tar acids. In the solvent-free condition, the recovered tar acids are substantially free of the thiophenols, as well as any lower aliphatic carboxylic acids that may have been present in the feedstock. In the absence of these contaminants, the tar acids possess only the odor characteristic of them. For some purposes, as in resin manufacture, it may be desirable to employ the effluent solution directly, thus dispensing with solvent stripping.

I have found that, depending upon the solvent employed, a small amount, barely more than a trace, of the anion exchange resin may be carried into the effluent solution. In addition, there may have been tar bases present in the original feedstock solution as a result of incomplete removal in the preliminary purification steps. Both the anion exchange resin and any tar bases may be removed in the following manner.

The effluent solution is conducted through conduit 24 and one of two inlet conduits 52 and 54 into one of the resin towers 46 and 48. The resin towers are vertical vessels adapted to confine a granular cation exchange resin which derives its exchange capacity preferably from acid groups such as the sulfonic or carboxylic groups. The solution is passed downwardly through the bed of resin whereby the bases from the anion exchange resin are adsorbed as well as the tar bases present in the tar acids. The resulting solution is discharged as effluent through one of the two outlet conduits 56 and 58 into a manifold 60 from which the solution is conducted through a conduit 62 to a solvent stripping tower 64 of the conventional type. In this tower, the solvent is removed by distillation through a conduit 66 while the pure tar acids and water are discharged at the bottom through a conduit 68. The solvent, of course, may be recycled for further use. The acids and water are separated by decantation in a decanter 70.

Regeneration of the anion exchange resin in towers 10 and 12 is preferably accomplished in the following manner. A dilute aqueous solution of an alkali hydroxide, e. g., 5–10 percent NaOH is conducted from a tank 42 through conduit 44 to one of the inlet conduits 32 and 34 and thence into the particular resin tower containing resin to be regenerated. The alkali selectively displaces the aliphatic carboxylic acids and any thiophenols adsorbed upon the resin. Any adsorbed tar acids, and there is always a minor fraction left on the resin, are substantially unaffected by the dilute alkali. The effluent alkali solution is discharged from the towers through one of the outlet conduits 36 and 38 into a main conduit 40. By this procedure, the loss of tar acids is reduced to nearly zero. The resin is then ready for retreatment of fresh feedstock. Should for any reason it be desired to strip the resin free of tar acids, then the above procedure should be modified by first passing a strong acid such as sulfuric or hydrochloric, in an organic solvent, preferably aqueous methanol, over the resin. The acid solution is conducted from a container 26 through conduits 28 and 44 to one of the inlet pipes 32 and 34 and thence into one of the treating towers 10 and 12.

The regeneration of the cation exchange resin in one of the towers 46 and 48 is effected while the other tower is onstream so that the process is uninterrupted. The resin may be regenerated by passing a solution of a strong acid, such as hydrochloric or sulfuric in an aqueous organic polar solvent, such as methanol, through the resin until the adsorbed bases have been removed.

The following examples illustrate the application of any process to commercially available mixtures of tar acids contaminated with thiophenols and to synthetic mixtures of tar acids and thiophenols, respectively.

*Example 1*

A feedstock consisting of a commercial sample of "cresylic acids" boiling range 191–225° C.) containing 1.27% by weight of thiophenols was subjected to the above described anion exchange resin treatment. The feedstock was first dissolved in 70% aqueous methanol (70 parts by volume of $CH_3OH$ and 30 parts by volume of $H_2O$) to make a 15% solution of the feedstock in the aqueous methanol. The resin employed was a quaternary ammonium anion resin in the hydroxyl form, sold under the trade designation of Amberlite IRA 410 by Rohm and Haas. The liquid hourly space velocity of the solution over the resin was 1. The effluent solution contained less than 0.01% by weight of thiophenols.

No removal of thiophenols was effected when the cresylic acids were passed over IRA 410 in the absence of solvent.

*Example 2*

A synthetic solution of 15% by weight of phenol in 70% methanol was prepared which also contained 0.5% by weight of thiocresol based on phenol. This was passed over IRA 410 resin at a LHSV of 2. The effluent contained less than 0.002% by weight of thiocresol based on phenol. This concentration of thiocresol is well below the level of detection by odor.

The success of the present process is critically dependent on the flow rate of the feedstock through the resin bed. This is in contrast to the removal of aliphatic carboxylic acids by anion resins described in the above-mentioned copending application S. N. 276,991, where the flow rate may be varied over a fairly wide range of values without affecting seriously the adsorption of the contaminant. In the present process, the flow rate must be regulated so as to maintain a liquid hourly space velocity of the feedstock that is less than 3. This is shown graphically in Figure 2 of the drawings for the separation of thiocresol from phenol. The influent was composed of a 15% (by weight) solution of phenol in 70% aqueous methanol containing 0.5% thiocresol (based on phenol charge). As the liquid hourly space velocity increases, the weight percent of thiocresol adsorbed drops rapidly, in fact precipitously. For practical reasons it is desirable to operate at a liquid hourly space velocity of less than three. Preferably the liquid hourly space velocity should be 2 or under.

The concentration of the thiophenols in the tar acids also affects, but not critically, the adsorption of the thiophenols. The smaller the concentration the more effective the resin becomes in adsorbing the thiophenols. This phenomenon is shown graphically in Figure 3 as exhibited specifically by a mixture of phenol and varying concentrations of thiocresol. The influents were composed of a 15% (by weight) solution of phenol in 70% methanol containing thiocresol in three different concentrations, 0.25, 0.50 and 1.00% by weight of phenol charged. Because of this behavior, the present process is uniquely suitable for removing the last trace of thiophenols, in contrast to other processes where the removal becomes more difficult with decreasing concentration.

When an organic polar solvent is employed as a solvent for the tar acid feedstock, some of the ion exchange base appears in the resin treated solution. This base may be readily removed by passing the solution through a cation exchange resin, preferably one which derives its exchange capacity essentially from sulfonic groups. At the same time any tar bases that may still be present in the tar acids are also removed. Thus, it is possible by sequential treatment with a strongly basic anion exchange resin and a cation exchange resin to recover tar acids free of thiophenols and tar bases.

In some instances, the thiophenols in the contaminated tar acids may have been oxidized to the corresponding disulfides, due to oxidation by air. In view of the neutral character of these disulfides, they are not removed by the anion exchange treatment described above. Pretreatment of the tar acids with a reducing agent reconverts the disulfides to thiophenols. For example, the reduction can be carried out by passing an acidic solution of the tar acids and disulfides through a zinic reductor. The pH of the solution should be adjusted to about 4.8. In tests using zinc amalgam and pure zinc, respectively, in the reductor 100% conversion of the disulfides to thiophenols was obtained. Very poor conversion was obtained when either iron or aluminum was used in the reductor instead of zinc. The pretreated solution of tar acids and reconverted thiophenols is passed promptly and preferably with air excluded to the ion treating zone, to avoid formation of disulfides by oxidation.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The process of separating thiophenols from phenols which comprises passing a solution of said thiophenols and phenols in an aqueous organic solvent selected from the class consisting of methanol, ethanol, acetone and methyl ethyl ketone at a liquid hourly space velocity of less than three reciprocal hours in intimate contact with a strongly basic anion exchange resin for a period longer than is required for the resin to become substantially completely saturated with the acidic constituents of the said solution but not longer than is required for the resin to become completely saturated with said thiophenols, recovering the effluent solution containing phenols substantially free of thiophenols, thereafter passing an aqueous solution of sodium hydroxide in intimate contact with said resin to restore its capacity for the present separation treatment, removing an effluent stream containing said sodium hydroxide and thiophenols, and repeating the process cyclically.

2. The process of separating thiophenols from phenols which comprises passing a solution of said thiophenols and phenols in an aqueous organic solvent selected from the class consisting of methanol, ethanol, acetone and methyl ethyl ketone at a liquid hourly space velocity of less than three reciprocal hours in intimate contact with a strongly basic anion exchange resin for a period longer than is required for the resin to become substantially completely saturated with the acidic constituents of the said solution but not longer than is required for the resin to become completely saturated with said thiophenols, recovering the effluent solution containing phenols substantially free of thiophenols, thereafter passing an aqueous methanolic solution of mineral acid selected from the class consisting of sulfuric and hydrochloric acid in intimate contact with said mineral acid and recovering the effluent solution containing thiophenols, thereafter passing an aqueous solution of sodium hydroxide in intimate contact with said resin to restore its capacity for the present separation treatment and removing an effluent stream containing said mineral acid and said sodium hydroxide, and repeating the process cyclically.

3. The method according to claim 1 in which the strongly basic anion exchange resin derives its exchange capacity essentially from quaternary ammonium groups.

References Cited in the file of this patent

UNITED STATES PATENTS

| | | |
|---|---|---|
| 2,184,928 | Luten et al. | Dec. 26, 1939 |
| 2,218,139 | Thomas et al. | Oct. 15, 1940 |
| 2,506,416 | Gilbert et al. | May 2, 1950 |

OTHER REFERENCES

Myers: Ion Exchange, Fiat Final Report No. 715, 1946, pgs. 17, 23 and 39.

The Resinous Reporter, vol. 9, No. 4, pgs. 9, 10, 11 (July 1948), 3 pgs.

Kunin et al.: Ion Exchange Resins, pgs. 66–67 (2 pgs.) publ. by John Wiley & Sons, New York (1950).

Kunin et al.: Ion Exchange Resins, 1950, pgs. 88 to 90.